Jan. 23, 1962  R. F. HELFINSTINE  3,018,070
AUTOMATIC CONTROL SYSTEMS
Filed Jan. 23, 1957  2 Sheets-Sheet 1

INVENTOR.
ROBERT F. HELFINSTINE
BY *Gordon Reed*

ATTORNEY

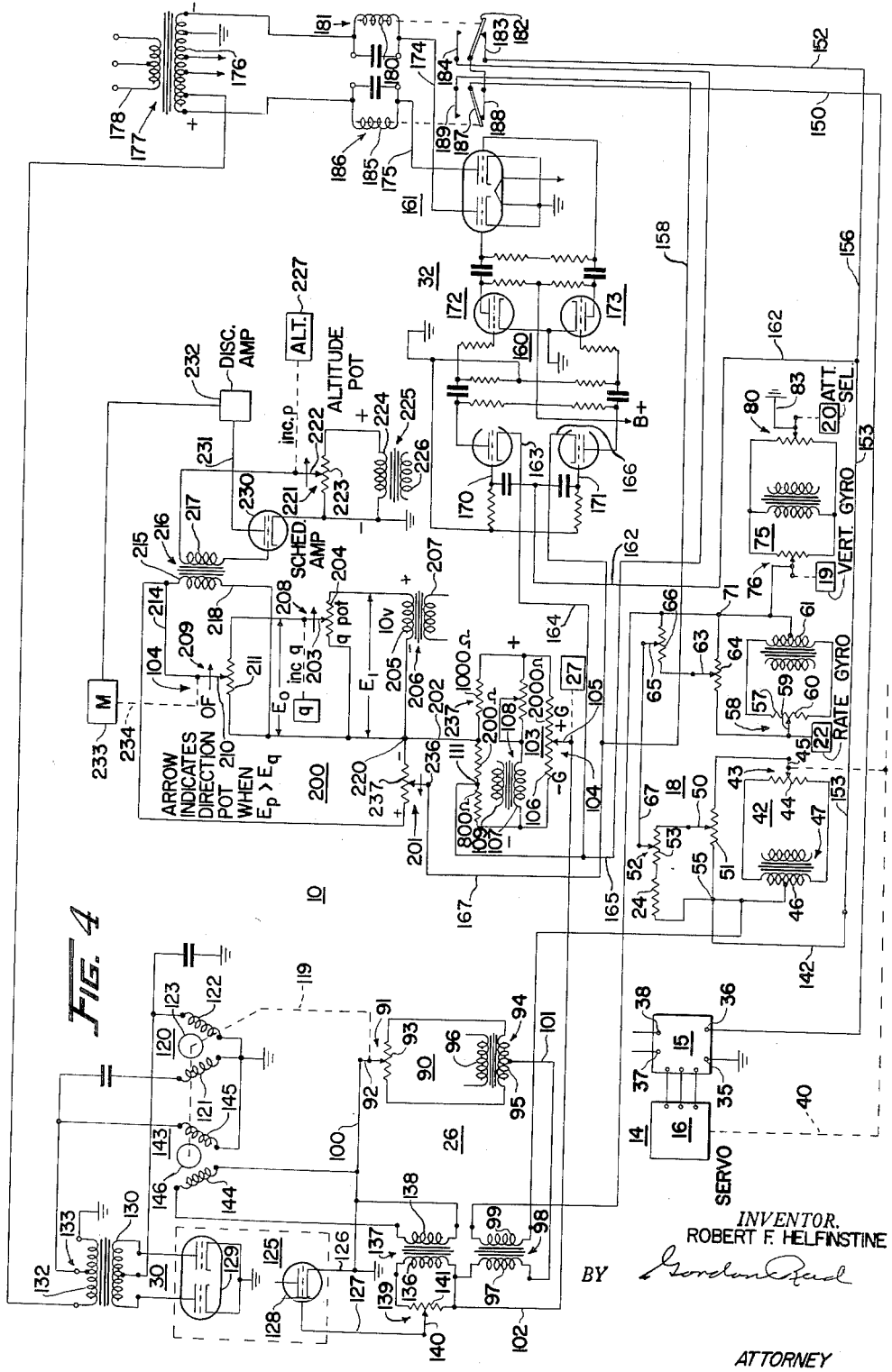

United States Patent Office 3,018,070
Patented Jan. 23, 1962

3,018,070
AUTOMATIC CONTROL SYSTEMS
Robert F. Helfinstine, Coon Rapids, Minn., assignor to Minneapolis-Honeywell Regulator Company, Minneapolis, Minn., a corporation of Delaware
Filed Jan. 23, 1957, Ser. No. 635,867
15 Claims. (Cl. 244—77)

This invention relates to automatic condition control systems wherein a condition may be maintained at a predetermined value and wherein selectively operable means effect a change in the magnitude at which the condition is to be stabilized. During the stabilizing of a condition by a control system having a condition change responsive means and a condition controlling device, the gain or sensitivity of the condition control system may be such that the positioning of the condition control device may result in exceeding the capacity, in some form, of the apparatus being responsive to the controlling device and which is utilized to return to the desired condition.

It may be necessary to limit the operation of the controlling device so that the capacity of the apparatus in the particular aspect involved as it restores the condition to the predetermined value is not exceeded. It is old to selectively fix a standard or provide a limit which is a standard of the maximum capacity of the apparatus being responsive to the controlling device, but it has been found that a fixed standard does not provide for all the various operating conditions.

By way of example, command signal limiting systems for aircraft control apparatus have been heretofore provided. In some such arrangements, when a command signal attains a predetermined value, the control of the autopilot is shifted from such existing command signal to another source of signal to prevent the aircraft being controlled from exceeding in its flight a selected quantity related to the craft. For example, command signal limiting arrangements may be used to prevent the craft from exceeding a predetermined bank angle by shifting control of the autopilot from an existing command signal to an artificial signal. Similarly, an aircraft may be prevented from exceeding a pre-set normal acceleration or load factor by switching control of the autopilot from one source of signal to another source of signal which second source will hold the aircraft within the desired load factor. In such later arrangements, the maximum allowable normal acceleration has been manually preselected. It has been determined, however, that a fixed value of standard of acceleration does not provide for all flight conditions involving the load factor of the aircraft.

It is therefore an object of this invention to derive a standard to which apparatus may be controlled and which standard will assume a variable magnitude depending upon the environment of the apparatus being controlled.

It is a further object of this invention to provide a flexible standard of control for an autopilot of a dirigible craft which standard is affected by flight conditions of said craft.

It is a further object of this invention to provide a flexible standard of control for an autopilot of a dirigible craft which standard is affected by the speed of the craft.

It is a further object of this invention to provide a flexible standard of control for an autopilot of a dirigible craft which standard is modified by the altitude of such craft.

It is a further object of this invention to provide a flexible standard of control for an autopilot of a dirigible craft which standard is effected jointly by the air speed and altitude of the craft.

It is a further object of this invention to provide a flexible standard related to the structural load factor of the aircraft which standard is effected jointly by the air speed and altitude of the craft.

The above and other objects and advantages not as yet particularly stated will become apparent from the following detailed description of a preferred embodiment of the invention when considered in connection with the subjoined drawing, wherein.

Figure 3:
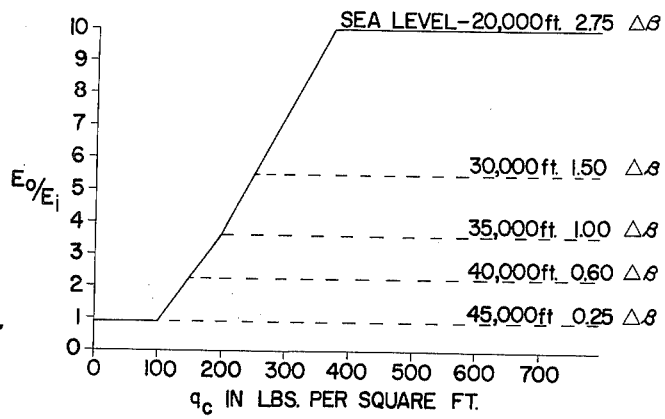
FIGURE 3 is a graph showing the desired scheduling to be applied to a limit function signal for various values of dynamic pressure and altitude of an aircraft.

FIGURE 4 discloses a preferred embodiment in electrical schematic form of a system embodying novel dynamic pressure and altitude scheduling of a limit function.

This application is an improvement of a command signal limiting arrangement shown in Patent 2,978,210 of John C. Larson, of April 4, 1961.

In the apparatus disclosed in the Larson patent, a limit function which is comprised of various control signals such as normal acceleration, pitch rate, etc. has been defined. This limit function has been provided whereby it assumes control of the autopilot of the aircraft so that the structural limits or load factor which is measured in so many G's is not exceeded.

In an aircraft in flight, we may plot the dynamic pressure ($qc$) of the aircraft as abscissas against ordinates of load factor. Such graph is a second order curve and the load factor will increase up to the structural load factor permitted on the aircraft. In other words, a control signal or limit function signal should not cause the autopilot to apply a control in the aircraft which would cause the aircraft to fly at an attitude at which the structural limit or load factor of the craft would be exceeded. For lower values of dynamic pressure, the limit function should be decreased so that the limit function would not permit the application of a control signal causing the load factor of the aircraft to increase above that provided on the graph otherwise the aircraft would stall.

The above discussed graph may be that provided for flight at sea level. The graph of dynamic pressure ($qc$) against load factor at high altitudes would fall considerably below that of the sea level graph depending upon the altitude being considered. Therefore at the higher altitude, the limit function which protects the aircraft against excessive load factor at sea level must in turn be modified in accordance with the altitude of the craft in order that the limit function prevents the application of a control to the aircraft such that a load factor would result on the aircraft which would fall above the dynamic pressure-load factor curve for the given altitude, otherwise again the aircraft would be placed in the stall condition.

The apparatus herein includes a gain control for the limit function for an apparatus as disclosed in the Larson application wherein the gain is modified in accordance with dynamic pressure and altitude of the aircraft.

From the above, a command signal limiter system as in the Larson patent is an arrangement in an automatic pilot whereby one control signal is substituted for the usual or normal control signal in the pitch axis of the auto-pilot when the response of the craft to the usual or normal signal causes the substitution of the one signal for the usual signal. The substitute signal is termed a limit function and is composed of various control signals defining that limit function, generally normal acceleration or an acceleration along the vertical or Z axis of the aircraft is one of the signals. The command signal limiter system in most instances substitutes one source of signal for the usual or normal source of control signal when the predetermined acceleration is attained. However, in certain conditions, the craft may be able to withstand the accelerations applied to it as far as its structure is concerned, but on the other hand, due to the signals from the usual or normal control circuit, its response will cause the craft to enter conditions causing stall or buffet on the aircraft. The stall and buffet conditions which an aircraft utilizing the apparatus in Larson would suffer are avoided by modifying the limit function in accordance with the dynamic pressure (impact-static) and the altitude which constitute the environment of the aircraft.

Figure 2:
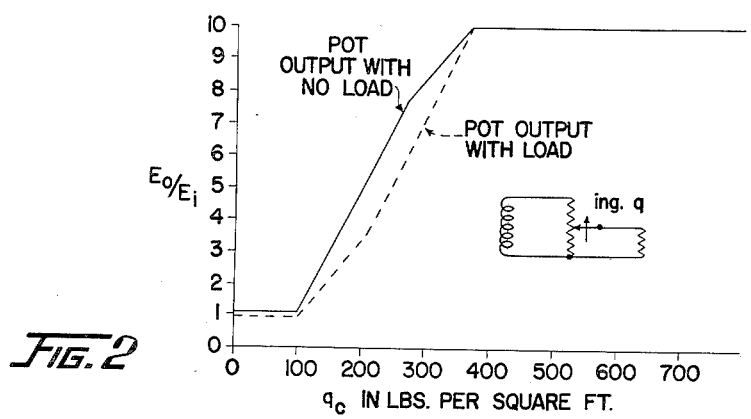
FIGURE 2 is a graph showing the relationship of dynamic pressure ($q$) and the load factor of the aircraft at stall conditions, the value of $q$ being in pounds per square foot.
Figure 1:
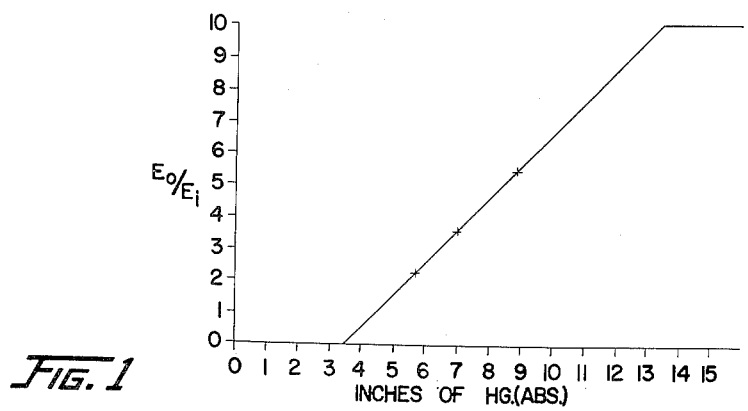
FIGURE 1 is a graph indicating the approximate linear relation between altitude of one aircraft and the load factor of the aircraft at which stall occurs, the altitude being given in inches of mercury.

Returning to FIGURES 1, 2 and 3, FIGURE 1 defines the maximum value in terms of voltage ratio, to be described, which is proportional to load factor that may be applied by the limit function to the aircraft at various altitudes where altitude is in terms of inches of Hg. FIGURE 2, considering the dotted graph, shows the change in voltage ratio (which is proportional to load factor) that may be applied by the limit function to the aircraft at various values of dynamic pressure (Q). FIGURE 3 shows the combination of FIGURES 1 and 2 and illustrates the permissible load factor, B, which may be applied through the limit function to an aircraft and the sharp cut-off points defined by the under section of the horizontal or altitude line with the graph should be noted. In other words, irrespective of increase in dynamic pressure on the aircraft, the load factor governing the limit function for 30,000 feet of altitude is defined in FIGURE 3 as approximately 5.5. The mechanism for scheduling the limit function in accordance with both altitude and dynamic pressure in the manner delineated in FIGURE 3 is provided by the arrangement of FIGURE 4. Before proceeding with a description of FIGURE 4, in clarification of FIGURE 1, 2 and 3, the ordinate of each of these three figures is a fraction $$\frac{E_o}{E_1}$$

This quantity represents the fractional part of the voltage of a transformer which must be deducted from the voltage provided by the limit function in order that the resultant voltage provided by the limit function as modified will prevent stall or buffet conditions of the aircraft.

While the invention has been considered broadly applicable to condition control apparatus, for the purpose of illustrating a preferred application of the invention, it has been shown as applied to a control system or automatic pilot for a dirigible craft such as an aircraft. In FIGURE 4, an autopilot 10 for an aircraft through a power means 14 comprised of an amplifier 15 and servomotor 16 operates an attitude control device (not shown) of the aircraft to control the angular attitude of the craft. This attitude control device may be a conventional elevator surface of an aircraft to control the craft in pitch attitude. Such elevator surface may be both manually and automatically controlled from the servomotor-amplifier combination 14. The amplifier-servo combination is old in the art and may be of the type disclosed in U.S. Patent No. 2,425,734, dated August 19, 1947, to Willis H. Gille et al. The amplifier thus may be a conventional A.C. discriminator amplifier for controlling a servomotor 16 powered from a D.C. source. As in the above referred to Larson application, the amplifier 15 comprises a pair of terminals 35, 36 which receive control signals and terminals 37, 38 connected to an A.C. supply. The direction of operation of the servomotor 16 depends upon the phase relationship of the control signal across terminals 35, 36 with respect to the voltage across power input terminals 37, 38.

The amplifier 15 is controlled by two control circuits 18 and 26. One control circuit, 18, normally controls the amplifier-servomotor combination 14 to maintain the craft in a given attitude or to effect changes in attitude under a desired selected control. The control circuit 18 includes a vertical gyroscope 19 for sensing craft pitch attitude, an attitude selector attitude command 20, a rate gyroscope 22 for sensing craft pitch rate; and a servo output actuator 40 which operates the pitch attitude controller. The vertical gyroscope 19 operates a potentiometer 76 to provide signal proportional to the change in craft pitch attitude, the selector 20 operates a potentiometer 80 to provide a signal proportional to a selected change in attitude, the gyroscope 22, operates potentiometer 58 to provide a signal proportional to the craft pitch rate, and the servo actuator 40 operates a potentiometer 43 to provide a signal proportional to the displacement of the actuator 40 from a normal position. A resultant signal is derived from the operation of the various devices 19, 20, 22 and 40 in an electrical summing circuit which signal is provided between a ground conductor 83 and a terminal 55 of the circuit. The voltage across the conductor 83 and terminal 55 is the usually effective stabilizing signal which controls the amplifier 15 and servomotor 16 whereby the attitude controlling device actuator 40 causes a change in pitch attitude of the craft from its existing attitude. During such change in attitude the aircraft will incur a "normal" acceleration which acceleration is along its vertical or turn axis. Should this actual "normal" acceleration or load factor be excessive the craft structure would be over-stressed.

To prevent such over-stressing, the alternative amplifier control circuit 26 will be substituted for the amplifier control circuit 18 on the amplifier 15. The signal derived from control circuit 26 may be termed a "limit function" and may be composed of signals derived from the response both of the aircraft and the mechanism within the aircraft resulting from the operation of the autopilot system 10 from the usual control signal derived from control circuit 18.

For purpose of illustration, the limit function control signal from control circuit 26 has in the Larson patent been defined for illustration of the invention as $$A_L - A_Z - \dot{\theta}\left(\frac{Ts}{1+Ts}\right) - \left(\frac{Ts}{1+Ts}\right)\delta e$$

In the above expression the term $A_L$ is termed the standard maximum normal acceleration or load factor to be tolerated, the term $A_Z$ is the actual acceleration "normal" of the aircraft, the term $$\dot{\theta}\left(\frac{Ts}{1+Ts}\right)$$

is termed the high passed pitch rate and the term $$\left(\frac{Ts}{1+Ts}\right)\delta e$$

is the high passed elevator displacement.

Passing for the time being the details of the control circuit 26, apparatus is provided for substituting control of amplifier 15 from network 18 to network 26. The apparatus which determines whether the network 18 or network 26 will control the amplifier 15 includes a discriminator 32 for a voltage comparing device. The discriminator comprises a voltage amplifying section 160 and a relay operating discriminator section 161. The amplifier section comprises two channels having a common voltage signal applied to the input section control grids 170, 171 and a separate common voltage applied to the respective input cathodes 163, 166. One of the amplifier sections 172, controls the conduction in a plate circuit 174 of the discriminator 161. Another amplifier section 173 controls the conduction in a plate circuit 175 of discriminator 161. The plate circuits 174, 175 of discriminator 161 are connected respectively to opposed ends of secondary winding 176 of a transformer 177 having a primary winding 178. Included in the plate circuit 174 is an operating winding 180 of a relay 181. Relay 181 includes an operable arm 182 which coacts with out-contact 183 and in-contact 184. Included in plate circuit 175 is an operating winding 185 of a relay 186 which additionally includes an operable arm 187. Arm 187 coacts with out-contact 188 and in-contact 189.

Returning to the amplifier section 160, it is noted that the input grids 170 and 171 of each amplifier section 172, 173 are capacitor coupled to a common connection from which extends a conductor 162. Conductor 162 is connected further through conductor 153 and conductor 142 to the terminal 55 whereby the normal or usual control signal for servo amplifier 15 is applied to the two grids 170, 171. The cathode input electrode 163 of amplifier section 172 is connected by conductor 164 to a tap 111 constituting one terminal of the control circuit 26 for negative limit acceleration. The cathode input electrode 166 of amplifier section 172 is connected by conductor 167 to a gain control potentiometer to be described, constituting another terminal of control circuit 26 for positive values of acceleration. The opposite control terminal of the control circuit 26 is connected to ground which is common with that of ground terminal 83.

The control circuit 26 for determining negative acceleration limit on the aircraft therefore comprises cathode 163, conductor 164, tap 111, acceleration responsive network 103, conductor 102, secondary winding 97 of transformer 98, conductor 101, a motor operated integration network 90, ground conductor 100. The configuration of network 26 to limit positive acceleration comprises cathode 166, conductor 167, a gain control potentiometer or voltage divider 201, conductor 202, acceleration responsive network 103, conductor 102, secondary winding 97, conductor 101, integration network 90, conductor 100 to ground, which is common to ground of network ground conductor 83.

Accelerometer responsive network 103 comprises a 2000 ohm potentiometer 104 having its resistor 106 connected across a secondary winding 107 of a transformer 108 having a primary winding 109. The potentiometer 104 includes an adjustable slider 105 driven by a linear accelerometer 27 responsive to the normal or acceleration of the craft along its vertical or turn axis. Network 103 includes three series connected resistors in turn connected in parallel with the potentiometer resistor 106 across the secondary winding 107. The three resistors have a respective resistance of 1000, 200 and 800 ohms. The junction of the 800 and 200 ohm resistors is connected to conductor 143 with the opposite end of the 800 ohm resistor connected to secondary winding 107. The opposite end of the 200 ohm resistor in turn is connected through the 1000 ohm resistor to the opposite end of secondary winding 107. The junction of the 200 and 1000 ohm resistors is connected through conductor 202 to the voltage divider 201.

The integrator network 90 comprises a potentiometer 91 having a resistor 93 connected across a secondary winding 95 of a transformer 94 having a primary winding 96. The potentiometer 91 includes an adjustable slider 92 operated from a suitable connection 119 by an integrator motor 120. The motor 120 may be a capacitor type induction motor and includes a line winding 121, an amplifier energized winding 122, and a rotor 123 connected to the operating means 119. The motor 120 is controlled from a discriminator amplifier 125 having an amplifier section 128 and a discriminator section 129. The discriminator includes a pair of plates connected respectively to opposite ends of a secondary winding 130 of a transformer 133 having a primary winding 132. The amplifier 128 includes the pair of control electrodes 126, 127 to which is connected a control circuit extending from control electrode 127, voltage divider 139, secondary winding 97 of transformer 98, integrator network 90, conductor 100, to electrode 126. The voltage divider 139 comprises an adjustable tap 140 connected to electrode 127 and a resistor 141 which is connected across a secondary winding 136 of an isolation transformer 137. Transformer 137 includes a primary winding 138 connected across a secondary winding 144 of a velocity signal generator 143. Velocity signal generator 143 includes a primary winding 145 and a rotor 146 driven by the motor 120 so that the voltage in winding 144 is proportional to the speed of rotor 146. The transformer winding 97 is energized through a primary winding 99 of transformer 98. The primary winding 99 of transformer 98 is energized from networks 42 and 57 through suitable gain potentiometers associated with the respective networks. The gain potentiometers for network 42 comprise an adjustable slider 50 and resistor 51 wherein the resistor 51 is connected across the follow-up operated potentiometer slider 45 and a center tap of the secondary winding 46 of a transformer 47 that energizes potentiometer resistor 44. Additionally there is included a further gain control potentiometer 24 having its resistor 53 connected between adjustable tap 50 and the center tap of secondary winding 46.

The gain control for network 57 comprises one voltage dividing potentiometer having a resistor 64 connected between a center tap of a secondary winding 61 of a transformer that energizes the resistor 60 of a potentiometer 58 and slider 59 of potentiometer 58. A second gain control is provided by a further potentiometer having a resistor 66 connected between the center tap of secondary winding 61 and the adjustable tap 63 of the first gain control potentiometer. A conductor 67 extends from an adjustable tap 65 which coacts with resistor 66 and the adjustable tap 52. Thus, the energizing circuit for primary winding 99 of transformer 98 extends from the center tap of the secondary winding 46 to one end of the secondary winding whereas the other end of the secondary winding 99 is connected to the center tap of secondary winding 61.

Control signals from the pitch rate gyro network 57 and the rebalance network 42 are applied to the control circuit of amplifier 128, which in turn effects the operation of the motor 120. Motor 120 operates the slider 92 of potentiometer 91 to rebalance the input circuit of amplifier 128. The summation of the signals from networks 42 and 57 along with the voltage from integrated network 90 provide the high passed pitch rate and high passed control surface displacement signals into the control circuit 26.

The apparatus thus far is substantially the same as that provided in the Larson patent referred to. The primary novelty herein is in modifying in accordance with the altitude and dynamic pressure constituting environmental factors of the aircraft the aforesaid limit function defined by the maximum acceleration, craft normal acceleration, and the sum of high passed pitch rate and high passed control surface displacement. To provide such modification of the limit function signal, the scheduling apparatus 200 is provided. Since the arrangement 200 is to provide both $q$ and altitude scheduling it includes a potentiometer 208 consisting of an adjustable slider 203 and resistor 204 which is connected across the secondary winding 205 of the transformer 206 having a primary winding 207. The slider 203 may be adjusted along resistor 204 in accordance with the dynamic pressure or $q$ of the aircraft. The slider 203 is moved rightward for increasing values of $q$. A rebalancing potentiometer 209 comprising the slider 210 and resistor 211 has its resistor connected between adjustable slider 203 and one end of the secondary winding 205. A conductor 214 connects slider 210 with one end of a secondary winding 215 of a transformer 216. The opposite end of winding 215 is connected through a conductor 218 to terminal 220 of winding 205. An altitude signal is provided by a potentiometer 221 having a slider 222 and resistor 223 which is connected across a secondary winding 224 of a transformer 225 having a primary winding 226. The slider 222 adjusted in accordance with altitude by an altitude responsive device 227 and for decreasing values of altitude or increasing $p$ the slider 222 is moved rightward in the figure. One side of potentiometer resistor 223 is connected to ground and the slider 222 is connected to one end of secondary winding 217 of transformer 216 with the opposite end of the winding 217 being connected to a control electrode of an amplifier 230. The amplifier 230 in turn supplies its output to a discriminator section 232 which section in turn controls a motor 233. The motor 233 through a suitable operating means 234 operates the slider 210 of potentiometer 209. The voltage amplifier 230, the discriminator 232 and the motor 233 may be similar to that comprising the amplifier 128, the discriminator, and the motor 120 for the integrator previously described.

It will be seen that the altitude voltage from potentiometer 221 is combined with the dynamic pressure or $q$ voltage from gain control potentiometer 209, through the summing transformer 216. If the amplifier 230 is unbalanced it controls the discriminator 232 which operates the motor 233. The motor in turn operates slider 210 to restore amplifier 230 to balance. The rebalance voltage provided by potentiometer 209 is also applied across the output potentiometer 201. The potentiometer 201 comprises a resistor 237 connected across terminal 220 and slider 210 of potentiometer 209. An adjustable slider 236 is adjusted along resistor 237 to select any desired voltage across the resistor 237. Conductor 167 extends from slider 236.

The scheduler amplifier 230 senses any difference in the magnitude of the outputs of the altitude potentiometer ($E_p$) and the air speed potentiometer ($E_q$). When $E_p$ is greater than $E_q$, the motor 233 will drive the wiper of the potentiometer 209 rightward to its limit so as to give maximum output from the air speed potentiometer or $q$ potentiometer 201 to the command signal limiter amplifier. A limit switch, not shown, will cut out the motor power when the potentiometer slider has reached its limit so that the motor will not drive constantly. When ($E_p$) is less than ($E_q$) the motor will drive so that the output across the potentiometer 209 is equal to ($E_p$), thus giving a constant output level regardless of increase in ($E_q$). Stated in other words, when the altitude pressure exceeds the dynamic pressure ($q$) slider 210 will be at the extreme right of resistor 211 so that the output across the output potentiometer 201 is that due to the voltage from the $q$ sensing potentiometer 208. Thus, the operation of the $q$ sensor through potentiometer 208 controls the magnitude of the output of potentiometer 201. In other words, scheduling is done slowly in accordance with dynamic pressure. This is in accordance with the arrangement shown in FIGURE 3 which shows that for dynamic pressures, before the low altitude pressure scheduling is done, is in accordance with $q$ values. However, when the dynamic pressure or ($q$) exceeds the altitude pressure, the slider 210 will be moved leftward from its extreme rightward position and the voltage across the output potentiometer 201 will correspond with that of the altitude pressure signal from potentiometer 221. Thus, irrespective of the change in the dynamic pressure reflected in the adjustment of potentiometer 208 a constant output will be provided by output potentiometer 201.

In setting up the scheduling arrangement 200, the phasing of the potentiometers should be as indicated in FIGURE 4. Additionally while in the Larson arrangement conductor 146 had been connected to an adjustable tap 114 corresponding with tap 236 herein for positive normal accelerations, in the present arrangement the connection to tap 114 is deleted. To provide the voltage corresponding to that between adjustable tap 114 and slider 105 in the Larson application the voltage across potentiometer 201 is summed with the voltage from limit control circuit 26. In other words, instead of the cathode 166 being biased positively only by a voltage between slider 105 and adjustable tap 114 it is now additionally biased by a voltage across the output potentiometer 201.

At decreasing $q$ values corresponding with decrease in air speed slider 203 moves leftwardly so that the positive bias on cathode 166 decreases. A decrease in this positive bias along with the control signal from control circuit 26 due to response of the aircraft and autopilot would cause the section 173 to become conductive at a lower value of the usual control signal than would be the case where the aircraft to be flying at a higher dynamic pressure or at a higher air speed. In other words, for example, the normal accelerometer 27 at the higher dynamic pressure would have to move to the right on potentiometer resistor 106, to a greater extent before the voltage from control circuit 18 exceeds that from control circuit 26 which two circuits have their voltages compared on the comparing device 32. It is further evident that when the dynamic pressure exceeds the altitude pressure that the position of slider 210 is determined by the altitude pressure and not by the pressure from the $q$ sensing potentiometer 208 and that the output of potentiometer 201 will be a constant value for a constant altitude thus providing a constant bias on the cathode 145. Thus, the limit function which defines the permissible response of the craft is reduced by a constant amount under these conditions.

Stall and buffet conditions in general are applied to the aircraft while it is at a positive normal acceleration. A method of modifying a limit function to avoid these conditions has been described. The negative limit acceleration may be fixed to some suitable value which would prevent difficulty in supplying fuel to the craft engine or mitigate pilot comfort.

*Operation*

The control circuit 26 supplies a resultant voltage signal based on aircraft normal acceleration, high passed pitch rate and high passed elevator displacement. The latter two are equivalent normal acceleration signals. The control circuit 26 at all times indicates in terms of a signal voltage the maximum additional normal acceleration, high passed pitch rate, or high passed elevator displacement that may be applied to the aircraft without exceeding its maximum standard normal acceleration $A_L$.

The incremental allowable signal is applied to the cathodes 163, 166 and the command signal or conventional autopilot signal is applied to the grids 170, 171. If the conventional autopilot signal exceeds in magnitude the allowable incremental normal acceleration signal or its equivalent signal, section 172 or 173 becomes conducting.

For "positive" acceleration limiting, cathode 166 and grid 171 are utilized. If the autopilot signal exceeds the incremental equivalent normal acceleration signal, a current passes through relay winding 185. With winding 185 energized, relay arm 187 engages in contact 189.

On such engagement, control circuit 26 is connected through conductor 167, conductor 158, relay contact 189, relay arm 187, conductor 150 to signal input terminal 36 of servo amplifier 15. By means of control circuit 26 the aircraft is controlled at its maximum normal acceleration. However, when the signal from control circuit 26 on cathode 166 exceeds the autopilot signal on grid 171, no further current passes through relay winding 185 and relay 187 falls to the out position engaging contact 188. Thereafter, control circuit 18 is connected to servo amplifier 15 and circuit 26 disconnected therefrom.

Reverting to FIGURE 4, the effect of arrangement 200 on the command signal limiter will now be considered. Assume some low value of altitude wherein slider 222 would be approximately at the right end of resistor 223. Also assume a low value of $q$ where slider 203 is toward the left end of resistor 204. At this time the potential on slider 210 would be slightly higher than that at terminal 220 and a small voltage is applied across potentiometer 201 and only a small incremental voltage is added to the voltage between terminal 220 and slider 105 which sum defines the permissible incremental normal acceleration of the craft.

With the altitude assumed constant, but $q$ increasing, the potential of slider 210 (for the assumed polarity indicated of secondary winding 205) increases in a positive direction so that a greater positive voltage is obtained from potentiometer 201 thereby indicating that a larger incremental normal acceleration of the craft can be applied than in the first instance of low $q$ considered. In other words a higher load factor can be applied to the aircraft without it entering the "stall" region. In other words if the "$q$" of the aircraft increases a higher load factor, up to a point, may be applied without the aircraft undergoing "stall."

During such scheduling in accordance with $q$, and initially with the altitude signal about equal to the $q$ signal slider 210 is at the right end of resistor 211. If we now began to increase altitude or decrease pressure while at the same $q$ value, the signal from potentiometer 221 on amplifier 230 decreases whereby the motor 233 adjusts slider 210 toward the left to effect balance of amplifier 230. The voltage from potentiometer 201 now decreases to thereby decrease in accordance with altitude the maximum incremental signal voltage or incremental load factor that can be applied without shifting control from network 18 to network 26. Thus again by scheduling in accordance with altitude, we prevent the aircraft from entering the stall area.

In the present configuration, the arrangement 200 merely schedules the limiting function voltage in accordance with dynamic pressure and altitude for positive accelerations. The shift from control network 18 to control network 26 for negative acceleration is effected through relay 181 and is similar to that in the aforesaid Larson application and is therefore not novel herein.

It will now be apparent that there has been provided a normal command signal limiter arrangement for an automatic pilot which provides for low altitude and high speed maneuverability of the craft through the automatic pilot and which arrangement also includes high altitude and low air speed modification of the command signal limiter arrangement of the automatic pilot to give adequate stall and buffet protection.

What is claimed is:

1. Control apparatus for a dirigible craft having an operable means for controlling longitudinal attitude thereof comprising: servo means positioning said operable means; a balanceable control circuit having output points and normally controlling said servo means including sources of control signals; signal generating means having output points and including means responsive to the altitude and air speed of said craft providing one signal and means responsive to the normal acceleration of said craft along its vertical axis for providing a further signal; means for comparing the magnitudes of the outputs of the signal generating means and the balanceable control circuit; and additional means responsive to said comparing means upon a predetermined difference of magnitude of said control signals for rendering the balanceable control circuit ineffective and the signal generating means effective to control said servo means, to limit the signal applied by said control circuit to said servo means.

2. Control apparatus for dirigible craft having operable means for controlling craft attitude about its lateral axis, said apparatus comprising: servo means positioning said operable means; a first source of control signal variable in magnitude in accordance with the craft pitch attitude, servo means position, and craft pitch attitude rate and normally controlling said servo means; a second source of variable control signal derived from a signal generator adjusted in accordance with the normal acceleration of the craft along its vertical axis and also in accordance with the craft altitude and craft air speed and normally disconnected from said servo means; comparing means responsive to both signals; and means controlled by said comparing means upon a predetermined differential in magnitude of said two control signals for rendering the first control signal ineffective and the second control signal effective to control said servo means so that when the first control signal exceeds the second control signal, the craft will be flown at its maximum acceleration.

3. In flight control apparatus for a dirigible craft; craft flight condition deviation responsive means; motor means controlled thereby and operating a condition changing means to correct said flight condition; sensing means responsive to a second condition of said craft resulting by operation of said condition changing means during correction of said condition by said condition deviation changing means; further means responsive to a third and a fourth flight condition associated with the operation environment of said flight control apparatus for determining the maximum permitted magnitude of said second condition; control comparing means responsive to said sensing means and said further means and also to said craft flight condition deviation responsive means for shifting control of said motor means from said craft flight condition deviation responsive means to said sensing and further means to prevent siad second condition exceeding that determined by said further means.

4. In an automatic flight control apparatus for an aircraft, in combination: aircraft position deviation responsive means; motor means controlled thereby and operating a craft position changing means to correct said deviation; sensing means responsive to an effect on said aircraft affecting its structural failure occurring during correction of said deviation; further means responsive to a co condition of air pressure associated with the environment of said craft for determining the maximum permissible magnitude of said effect produced on said aircraft; control means responsive to said sensing means and said further means and to said craft position responsive means for shifting control of said motor means from said position responsive means to said sensing and further means to prevent said effect exceeding that determined by said further means.

5. In an automatic condition control system for an aircraft having condition changing means, in combination: a flight condition deviation responsive means, motor means controlled thereby and operating said condition changing means to correct said condition; sensing means responsive to an effect produced on said craft resulting during correcting of said condition; further means responsive to the altitude and air speed of said craft for determining the maximum permissible magnitude of said effect on said craft during correcting of said condition; control means responsive to said sensing means and said further means and also to said condition responsive means for shifting control of said motor means from said condition responsive means to said sensing and further means to prevent said effect exceeding that determined by said further means.

6. In an automatic flight condition control apparatus for an aircraft having flight condition changing means, in combination: a flight condition deviation responsive means; motor means controlled thereby and operating said condition changing means to correct said deviation; sensing means responsive to an acceleration effect on said aircraft occurring during correction of said condition deviation; further means responsive to air pressure on said aircraft associated with the environment of said craft for determining the maximum magnitude to be permitted of said effect on said aircraft; command signal limiting means responsive to said sensing means and said further means and to said condition responsive means for shifting control of said motor means from said condition responsive means to said command signal limiting means to prevent said acceleration effect on said aircraft exceeding that determined by said sensing and further means.

7. In flight condition control apparatus for a dirigible craft including an operable device for changing said condition, in combination: motor means operating said device; a control means connected to said motor means to control operation thereof; a first signal providing means normally operating said control means; a control means operating signal limiting means, including a means providing an effect affecting the structural failure of the craft responsive to a manner of change of said flight condition and further means responsive to the air pressure environment of said apparatus for determining the permissible magnitude of said effect or manner of change of said condition, for providing a second signal; means for comparing said first and second signals and operable on a predetermined difference thereof for rendering the first signal providing means ineffective on said control means and controlling said control means from said control means operating signal limiting means.

8. Control apparatus for an aircraft having an elevator control surface for controlling craft attitude, said apparatus comprising: servo means operating said surface; a first source of control signal voltage variable in magnitude normally controlling said servo means; a second source of variable control voltage signal, including means responsive to craft change in normal acceleration along its vertical axis developing a control signal and further means responsive to craft altitude and air speed developing a signal defining the maximum permissible change in normal acceleration and opposed to said control signal; means connecting said first voltage signal source to said servo means; means for comparing said first source and second source signal voltages whereby upon a predetermined differential of said two voltage signals said first voltage signal source is disconnected from said servo means and said second voltage signal source is connected to said servo means.

9. In control apparatus for an aircraft having an elevator control surface for controlling craft attitude and wherein said apparatus includes servo means positioning said surface and a first source of control signal voltage variable in magnitude normally controlling said servo means, a command signal limiting arrangement to prevent stall and buffet of said aircraft comprising a first means providing a first signal responsive to the pressure environment of said craft, means responsive to the normal acceleration along the craft vertical axis or load factor on said craft for providing a second signal and means for obtaining a resultant voltage signal from said first and second signals; means for comparing a signal from said first source of control voltage and said resultant voltage signal; and means responsive to a predetermined differential of said first source signal and said resultant signal for disconnecting said first source of voltage from said servo means.

10. In an automatic pilot for an aircraft, said automatic pilot having a command signal limiting arrangement responsive to a first and second signal connected in opposing relation for transferring control of said automatic pilot from one source of control signal to a second source of control signal upon a predetermined difference of said two signals and wherein said second source of control signal includes means responsive to the normal acceleration of the craft along its vertical axis or load factor of said aircraft, in combination with said normal accelerometer responsive means for setting up a standard craft acceleration or load factor value which is not to be exceeded by the craft, a first generator of signal voltage variable with the altitude of said craft, a second generator of signal voltage variable with the air speed of said craft, a ratio device for said second signal generator for selecting a portion of the voltage thereof, means for combining said selected portion of said second signal and said altitude signal, an amplifier controlled by said combined signal, a motor controlled by said amplifier and operating said ratio device, stop means for limiting the maximum displacement of said ratio device by said motor, and means connecting said ratio device with said second source of control signal for setting up said standard voltage from said ratio device, whereby when a predetermined altitude defining a limit function is obtained said ratio device is moved away from its stop during increases in air speed to maintain the standard limit voltage constant whereas with the same altitude, and decreasing values of air speed the ratio device moves against its stop and is held there so that the limit function standard voltage decreases with decrease in air speed.

11. Control apparatus for an aircraft having an elevator control surface for controlling craft attitude, said apparatus comprising: servo means operating said surface; a first source of control signal voltage variable in magnitude normally controlling said servo means; a second source of variable control voltage signal including means responsive to the normal acceleration or acceleration along the vertical axis of said craft providing a first component of said second signal and means responsive to the altitude and air speed of the craft for defining a second component of said second voltage signal, said second component having a fixed limit value at a certain altitude and air speed despite increases in air speeds at the altitude but defining a variable limit value at said altitude upon decrease in air speeds of the craft when said second signal is opposed to said first signal component; means for comparing said first and second voltage source signals whereby upon a predetermined differential of said two voltage signals, said first voltage signal source is disconnected from said servo means and said second voltage signal source is connected thereto whereby the normal acceleration of the craft does not exceed that defined by the normal accelerometer and altitude and air speed responsive means.

12. Control apparatus for an aircraft having an elevator control surface for controlling craft attitude and also thereby causing normal acceleration of said craft, said apparatus comprising: means producing a primary control voltage; a voltage responsive servo mechanism for controlling the elevator surface; means for producing a first voltage component varying in response to normal acceleration of said craft along its vertical axis; means for producing a supplemental control voltage component varying with the altitude and air speed of said craft; and means comparing the primary voltage with the first and supplemental voltages for applying to said servo mechanism a control voltage varying as the sum of said first and supplemental voltage components if the primary voltage exceeds the sum of the first and supplemental voltages.

13. Control apparatus for an aircraft having an elevator control surface for controlling craft attitude, said apparatus comprising: servo means operating said surface; voltage responsive control mechanism for controlling said servo means; means for producing a voltage component varying with the actual acceleration along the craft vertical axis or load factor of said craft; means for producing a standard load factor control voltage component; means for applying to said control mechanism a resultant voltage varying as the combined values of said two voltage components; and means for varying said standard load factor component in accordance with the air speed and altitude of said craft.

14. The apparatus of claim 13 wherein said standard voltage component producing means responsive to altitude and air speed includes means providing that the value of the standard component has a fixed limit value at a certain altitude and air speed despite subsequent increases in air speed.

15. In an automatic flight condition control system for an aircraft: flight condition change responsive means; motor means responsive thereto and operating a flight condition changing means to remove said change and thus correct said condition; sensing means responsive to a second flight condition produced by operation of said condition changing means during correcting of said condition; further means responsive to a third flight condition associated with the operational environment of said flight condition control system modifying the response of the sensing means; control means responsive to said sensing means as modified by the further means and also to said flight condition change responsive means for shifting control of said motor means from said flight condition change responsive means to said sensing means to prevent said second flight condition as modified by the further means exceeding a predetermined value.

References Cited in the file of this patent

UNITED STATES PATENTS

| | | |
|---|---|---|
| 2,487,793 | Esval et al. | Nov. 15, 1949 |
| 2,875,965 | Anderson et al. | Mar. 3, 1959 |
| 2,768,343 | Kutzler | Oct. 23, 1956 |